Patented May 19, 1936

2,040,879

UNITED STATES PATENT OFFICE 2,040,879

SUBSTANTIALLY UNDEGRADED DEACETYLATED CHITIN AND PROCESS FOR PRODUCING THE SAME

George W. Rigby, Wilmington, Del., assignor to E. I. du Pont de Nemours & Company, Wilmington, Del., a corporation of Delaware No Drawing. Application June 21, 1934, Serial No. 731,600

20 Claims. (Cl. 260—54)

This invention relates to polymeric carbohydrate derivatives and process of treating the same and more particularly to processes for the treatment of chitin and chitin-like materials.

Chitin is a polymeric acetamino derivative of a carbohydrate. It occurs in the shells of various crustacea and has been recognized to have a structure related to that of cellulose, wherein in place of the glucose building stone of the cellulose, the building stone is chitosamine in the form of the acetyl derivative. Wester reviews the subject in Archiv der Pharmazie 247, 282—307 (1909).

A material known as chitosan has been prepared by fusing chitin with 50% potassium hydroxide at 160° C. or above. These conditions are, it has now been found, entirely too drastic to obtain an undegraded deacetylated chitin. The literature on this subject is silent on the action of oxygen or oxidizing agents upon chitin or chitosan to form degradation products.

This invention has as an object the preparation of substantially undegraded deacetylated chitin. A further object is the preparation of salts of substantially undegraded deacetylated chitin. A further object is the preparation of technically useful water soluble salts of the deacetylated chitin. A still further object is the preparation of films, threads, sizing agents, and the like from deacetylated chitin. Other objects will appear hereinafter.

These objects are accomplished by the following invention wherein chitin is reacted with caustic alkali in varying concentrations at elevated temperatures, the concentration of the caustic alkali being lower as the temperature is more elevated. From the deacetylated chitin thus prepared, there are prepared salts of the deacetylated chitin and solutions thereof, which solutions are further treated for the formation of formed objects.

Example 1.—According to the present invention, chitin-containing materials such as shrimp, lobster or crab shells are freed from adhering contaminant material such as flesh, by treatment first with a 1% solution of soda ash at the boiling temperature for about six hours. This alkaline treatment is then, after a thorough washing, followed by a treatment with 5% hydrochloric acid until all lime salts have been removed. After the acid has been thoroughly removed by washing, the shells are given a second alkaline treatment with a 1% solution of soda ash containing about 0.02% of soap or other detergent material, this treatment being carried out at the boiling point for about eight hours. After this, the solution is drained off and the shells washed until neutral to phenolphthalein. The product of this treatment is chitin which is obtained as a relatively pure, white, material. This is centrifuged to remove excess water.

The pure white chitin obtained by the above or other purification process is treated with 40% sodium hydroxide at 110° C. for about four hours, under conditions which substantially exclude oxidation. At the end of this time the hot caustic solution is drained off and the shells washed with water until neutral to phenolphthalein. The deacetylated chitin thus obtained is pure white. After drying at 65° C. it is dissolved in an aqueous solution of acetic acid in the proportion of 161 grams of deacetylated chitin to 48 grams of acetic acid. The viscous solution of deacetylated chitin thus obtained may be formed into films, filaments and the like, by removing excess water with heat or by allowing the aqueous solution to evaporate at room temperature. The viscosity of the final product may be controlled by the use of different temperatures of deacetylation, of different concentrations of caustic, of different lengths of caustic treatment as well as by controlled oxidation.

The following additional examples illustrate the invention but are not to be regarded as limitative thereof.

Example 2.—In an earthenware crock provided with a false bottom were placed 25,000 parts of shrimps "heads and hulls". The shells were covered with 200,000 parts of water to which had been added 900 parts of soda ash and 18 parts of "hymolal" salts (a mixture of sodium salts of sulfate esters of $C_8$ to $C_{18}$ primary alcohols mainly lauryl). Direct steam heat was applied for about four hours. The water was then drained off, the shells washed with fresh water and the soda ash treatment repeated. This left the shells free from adhering meat and almost pure white. After washing free from alkali the shells were covered with 200,000 parts of water containing 5000 parts of 35% hydrochloric acid and left over night. The next morning the acid was drained off and the shells washed repeatedly with fresh water to remove all adhering salts. Finally the chitin was given an alkali boil with 900 parts of soda ash and 18 parts of a good textile soap in 200,000 parts water. This treatment left the chitin in a pure white condition. After washing with fresh water until neutral to phenolphthalein, the chitin was dried at 65° C. in an air dryer.

Yield 5,670 parts or 22½% based on the dry weight of the shells.

Twenty-five (25) parts of chitin were then treated with substantial exclusion of air at 115° C. during six hours with 1,200 parts of 40% sodium hydroxide. At the end of this time the caustic was drained off and the shells washed with water until neutral to phenolphthalein. After drying at 65° C. the yield was 20 parts of deacetylated chitin containing about 0.82 free amine groups per chitosamine residue.

One hundred and sixty-one (161) parts of deacetylated chitin prepared as above were mixed with 48 parts of acetic acid and 3,981 parts of water. After stirring to complete solution the mixture was filtered through an appropriate filter and cast on a glass plate. After evaporating to dryness the films thus obtained had a tensile strength of approximately 9,000 lbs. per sq. in. The viscosity of the 5% solution thus prepared was approximately 600 poises.

*Example 3.*—Five hundred and twenty (520) parts of crab shells were placed in a suitable crock and mixed with 9,000 parts of water containing 25 parts of trisodium phosphate and 2½ parts of hymolal salts together with 2½ parts of pine oil. The solution was boiled with live steam during one hour, the liquid poured off and the shells washed repeatedly until neutral to phenolphthalein. The shells were then covered with 9,000 parts of water containing 600 parts of concentrated hydrochloric acid. After standing overnight the shells were washed with fresh water until neutral to methyl orange. The product was then treated with 10,000 parts of water containing 100 parts of sodium carbonate, 10 parts of good textile soap and 10 parts of pine oil. After boiling with live steam during three hours the shells were perfectly white. The liquid was drained off and the shells washed with hot water until neutral to phenolphthalein. The pure white chitin thus obtained was treated as in Example 2 to form deacetylated chitin. The yield of chitin was 16½% based on the dry weight of the shells.

*Example 4.*—Twenty-eight thousand (28,000) parts of dry shrimp meal were placed in a suitable crock. One hundred and eighty thousand (180,000) parts of water containing 5,000 parts of concentrated hydrochloric acid were added and the mixture stirred until all lime was removed. After washing with water until neutral to methyl orange, the lime free shells were treated with soda ash and soap as above. The chitin thus obtained was treated with caustic to prepare deacetylated chitin as in Example 2.

*Example 5.*—Shrimp meal contained in a suitable vessel was treated with gaseous sulfur dioxide or its equivalent until absorption of $SO_2$ was complete. The shells were then transferred to an autoclave and sulfur dioxide under pressure added together with water until a saturated aqueous solution of $SO_2$ was obtained. The autoclave was filled and the mixture heated to 130° C. during about six hours. The product thus obtained was washed with water until free from all lime salts and free from adhering proteinous material. This chitin was treated as in Example 2 to prepare deacetylated chitin and solutions thereof.

*Example 6.*—Chitin as obtained in Examples 2 to 5 is treated under limited access of air with 50% sodium hydroxide in the proportions of 1 part chitin to 10 parts sodium hydroxide solution at 100° C. during one hour. The product is then washed free from alkali and dried. The deacetylated chitin thus obtained is completely soluble in dilute acetic acid and contains about 0.82 free amine groups per chitosamine residue. A 5% solution of this deacetylated chitin in 1½% acetic acid had a viscosity of approximately 2,800 poises.

*Example 7.*—In order to approach complete deacetylation, the following method is recommended. One part of pure chitin obtained as above is intimately mixed with ten parts of 50% sodium hydroxide in a vessel suitable for the essential exclusion of air. The mixture is then heated to 100° C. for 48 hours with stirring, air being excluded. At the end of this time, the product is isolated in the usual manner. The product prepared as described approaches complete deacetylation.

*Example 8.*—Forty (40) parts of a 5% solution of deacetylated chitin was prepared as in Example 6. This solution had a viscosity of 2,800 poises. Ten (10) parts of a hydrogen peroxide solution containing 0.019% $H_2O_2$ was added. After thoroughly mixing the solution was heated at 50° C. during four hours. After cooling to room temperature the product had a viscosity of about 5.2 poises. The solution thus obtained was used with good results as a sizing material, as a film-forming material, and in preparing filaments.

*Example 9.*—Three (3) parts of deacetylated chitin as prepared in Example 2 were mixed with 2.27 parts of benzoic acid. To this mixture were added 67 parts of water. The mixture was stirred until the deacetylated chitin was completely dissolved. It was then filtered, and then cast into films, filaments, and the like. Strong tough transparent and flexible films and filaments were obtained.

As starting materials, any of the ordinary chitin-containing raw materials may be used. These include the shells of shrimps, crabs, lobsters and other crustacea. The waste from certain canning industries is a very suitable source of such raw materials. Insects such as beetles, grasshoppers, locusts and the like may also be used. Fungi such as *Aspergillus niger*, mushrooms and the like may also be used, but the shells of crustacea are preferred as raw materials.

The method of purification adopted depends chiefly upon the type of raw material used and upon the amount and character of the foreign matter such as protein and other impurities to be removed. Moreover, the quantities and types of detergents used will be determined largely by the quantity of protein materials to be removed. Thus, for some batches of "shrimp meal" is is advantageous to use caustic soda in place of soda ash while for the usual type of "crab backs" an even milder detergent than 1% soda ash may be used. Thus, the quantity, concentration, and type of detergent used may be varied according to the needs of the particular raw material used. In place of soda ash, trisodium phosphate or caustic soda, or other agents capable of rendering proteinous materials soluble may be used. It is thus possible to use sodium sulfide, sodium sulfite, sodium bisulfite, calcium bisulfite, potassium carbonate, sodium bicarbonate, potassium bicarbonate, potassium hydroxide, calcium hydroxide, copper ammonium solution, sodium silicate, sulfurous acid and certain putrificative bacteria as agents in removing the adhering proteins from the chitin. In general, agents capable of exerting a peptizing action on proteinous materials are suitable for use in separating chitin from the other constituents present in the raw material.

In the special case of the use of certain fungi as raw materials it may be desirable to separate chitin from cellulose. This may be done with copper-ammonium or sodium thiocyanate solutions or by xanthation or other means by which cellulose is rendered soluble while chitin is unaffected.

The quantity and type of acid used to remove lime and other inorganic salts may vary with the type of raw materials. Thus, in Example 1, use was made of hydrochloric acid of about 0.875% concentration. However, if a countercurrent system is used, an acid of lower concentration may be employed in the first treatment, where acid of higher concentration is used in the final treatment to remove the last traces of inorganic salts. Other inorganic acids forming soluble calcium salts, such as nitric acid, sulfurous acid, and other inorganic acids or organic acids such as acetic and formic may be used in place of hydrochloric acid to remove lime.

The order in which the acid and alkaline purification treatments are employed may be varied, the order depending to a considerable extent upon the type of raw material used. Thus, in case large quantities of water soluble materials are present it is more economical to give a dilute alkali treatment followed by acid since the acid may thus be used exclusively to remove lime rather than be used up in reacting somewhat with the protein material present. If, on the other hand, the raw materials consist of the comparatively clean "crab backs" the acid treatment may be given first, since lime is the essential ingredient to be removed in this case.

No bleaching step will be found necessary in case the acid and alkali treatment is carried out properly. In case, however, that it is desired to bleach the chitin a dilute solution of potassium permanganate, sodium hypochlorite, or sulfur dioxide, or a solution of sodium hydrosulfite, sodium bisulfite or other mild bleaching agent may be used. In general, however, no bleaching agent is required.

The treatment of the shells with alkali is continued only until the proteinous material has all been loosened and made water soluble. The acid treatment is continued only until all the lime has been removed and made water soluble. Washing with water after each step is, of course, advisable. The temperature at which the alkaline treatment is given may vary, but a temperature of about 100° C. is preferred because of the economy of time, convenience of operation, etc. By the use of pressure equipment the time of reaction may be shortened. The temperatures of acid treatment may likewise be varied from 0 to 100° C. although temperatures of about 25° C. are more economical of chitin. The most favorable temperature depends considerably upon the acid used to remove the lime salts. The concentration of the acid used may vary from a few parts per million to a concentrated acid. The use of concentrations of about 5% for the final acid treatment and of about 1 to 1½% hydrochloric acid for the first treatment has been found economical of chitin.

The extent to which chitin is deacetylated by means of aqueous caustic alkali is probably governed by the following factors: caustic alkali concentration, temperature of deacetylation, time of contact with the caustic alkali, previous treatment of the chitin, particle size, and finally, the density of the chitin. While these factors appear to be very closely inter-related, the following generalizations may be drawn. First, holding all other factors constant, an increase in caustic alkali concentration increases the extent to which deacetylation is carried. Second, for each definite caustic alkali concentration an increase in temperature, other factors being constant, increases the extent to which deacetylation is carried. Third, at a given caustic alkali concentration and temperature, other factors being constant, an increased time of reaction increases the extent of deacetylation. In other words, it is believed that there is no appreciable reverse reaction involved. Fourth, any previous treatment of the chitin which renders it more accessible to the caustic alkali will undoubtedly increase the extent of deacetylation at a given caustic concentration, temperature, and time of contact, although it is very difficult to differentiate this factor from that of particle size and density. Previous treatment of the chitin is however of importance. Fifth, the particle size of the chitin which is used governs largely the area which is available to the caustic alkali and hence the rate at which the caustic alkali penetrates the particles, thus causing deacetylation to depend, at a given caustic alkali concentration and temperature, other factors being constant, upon the particle size. Sixth, the density of the chitin particles influences the rate at which the caustic alkali penetrates, hence, regulates the extent to which deacetylation takes place, other factors being constant.

The deacetylation step may be carried out with caustic alkali concentrations of from 5 to 60% by weight. The time and temperature of reaction are adjusted in accord with the caustic alkali concentration adopted. In general the higher the concentration of caustic alkali, the lower the temperature and/or the shorter the time of the deacetylation treatment. Thus, when 5% caustic soda is used at 150° C. about twenty-four hours are required to reach a soluble stage of deacetylation. With 50% caustic soda at 100° C. only about one hour is necessary to reach the same result. With 40% caustic soda at 100° C. about eighteen hours are required to reach the same degree of deacetylation as in the above two instances. In any event the alkaline treatment is continued until the product is at least swollen by or soluble in dilute acetic acid, and is discontinued before the product becomes degraded to a substantial degree and by this is meant that the treatment is discontinued before the reaction has proceeded to the point where the nucleus of the hexose amine polymer is broken down to such an extent that a continuous film can no longer be obtained from the solution of the product in dilute acetic acid. Chitiniferous material from different sources have been found to vary somewhat in their sensitiveness to alkaline reagents and therefore conditions are controlled during deacetylation avoiding conditions so drastic as to cause any substantial evolution of ammonia or degradation of the hexose amine polymer.

Free access of oxygen to the chitin during the deacetylation step has a substantial degrading effect on the deacetylation chitin obtained. Therefore during the deacetylation step the reaction is carried out with a limited access of air as by the use of closed vessels or vessels in which the surface of the reaction mixture exposed to air is low as compared with the volume of the reaction mixture. Thus in a cylindrical reaction vessel where the diameter of the exposed surface is not more than the depth of the reaction mixture, a sufficiently limited access of air is secured. In stirring the surface is not often renewed. The following tables illustrate the effect of time, temperature and caustic alkali concentration upon the properties of deacetylated chitin as measured by viscosity, solubility, and tensile strength of films prepared from the solution, all of which are influenced markedly by degradation of the chitin molecule.

Table I

Effect of time on the quality of deacetylated chitin prepared with 50.9% NaOH at 100° C. using 20-40 mesh crab chitin

| No. | Chitin (parts) | NaOH soln. (parts) | Time (hrs.) | Viscosity 5% soln. (poises) | Tensile strength of films (lbs. per sq. in.) |
|---|---|---|---|---|---|
| 1. | 5 | 50 | 1. | 630 | 9,625 |
| 2. | 5 | 50 | 2.5 | 63 | 8,200 |
| 3. | 5 | 50 | 6.0 | 46 | 8,140 |
| 4. | 5 | 50 | 16.0 | 36 | 7,620 |
| 5. | 5 | 50 | 48.0 | 11 | 8,250 |

Table II

Effect of time on the preparation of deacetylated chitin by means of 39.1% NaOH at 100° C. using 20-40 mesh crab chitin.

| No. | Chitin (parts) | NaOH soln. (parts) | Time (hrs.) | Viscosity 5% soln. (poises) | Solubility |
|---|---|---|---|---|---|
| 1. | 5 | 50 | 2 | | Only slight |
| 2. | 5 | 50 | 4 | | Highly swollen |
| 3. | 5 | 50 | 6 | | Almost complete |
| 4. | 5 | 50 | 18 | 96 | Good solution |
| 5. | 5 | 50 | 20 | | Good solution |
| 6. | 5 | 50 | 48 | 21.5 | Good solution |

Using 30% sodium hydroxide at 100° C. under the same conditions as the above experiment it was found that the threshold of solubility (completely swollen, fully transparent particles) was reached after 72 hours' heating.

At higher temperatures the following results were obtained:

Table III

Effect of using higher temperatures and lower caustic concentrations. Chitin heated at 120° C. with 40.0% NaOH using shrimp chitin of 40-60 mesh.

| No. | Chitin (parts) | NaOH soln. (parts) | Time (hrs.) | Viscosity 5% soln. (poises) | Solubility |
|---|---|---|---|---|---|
| 1. | 5 | 50 | 1 | 20 | Excellent |
| 2. | 5 | 50 | 4 | 21 | Excellent |
| 3. | 5 | 50 | 8 | 16 | Excellent |
| 4. | 5 | 50 | 16 | 8 | Excellent |
| 5. | 5 | 50 | 32 | 4.4 | Excellent |

With 29.2% sodium hydroxide the threshold of solubility at 120° C. was reached after 32 hours. Using 20% sodium hydroxide at 140-145° C. in 24 hours the product was completely soluble to give a viscosity of 0.67 poise for a 7% solution. Under the same conditions 10% sodium hydroxide gave complete solubility but the viscosity of the solution was not determined. Ammonium hydroxide of 28% concentration at 140° C. for four hours did not give complete solubility. When highly concentrated caustic alkali solutions are used the treatment must be conducted at a lower temperature since concentrated caustic alkali at elevated temperature causes drastic changes in the chitin molecule as evidenced by ammonia evolution, water solubility of the product and the crystalline nature of the salts of the product.

Such a treatment as for example heating at 160° C. with 50% potassium hydroxide results in a degraded product.

Other basic materials than sodium hydroxide may be used. Thus one may use potassium hydroxide, lithium hydroxide, calcium hydroxide, trisodium phosphate, etc.

Tables I, II, and III also show the effect of time of heating upon the viscosity of the resulting deacetylated chitin. It will be noticed that, under specific conditions of caustic concentration and temperature, increased time of heating decreases the viscosity of the resulting deacetylated chitin.

Example 8 illustrates a second method found practical in lowering the viscosity of deacetylated chitin solutions. Other oxidizing agents than hydrogen peroxide may be added to the deacetylated chitin solution. Thus chlorine, bromine, hypochlorous acid, perborates, permanganates, bichromates, oxygen, air and other oxidizing agents may be added to solutions of deacetylated chitin and a reduction in viscosity is obtained corresponding to the amount of oxidizing agent added. The following table illustrates the effect of hydrogen peroxide, but it is to be understood that other oxidizing agents have a similar effect when used in the same oxidation equivalent quantities.

Table IV

| $H_2O_2$ conc. parts per million | Time hours | Viscosity sec. | Time hours | Viscosity sec. |
|---|---|---|---|---|
| 670 | 1.4 | 5.8 | 5.4 | 1.0 |
| 332 | 1.4 | 7.0 | 5.4 | 1.2 |
| 168 | 1.3 | 9.2 | 5.4 | 1.5 |
| 82 | 1.3 | 10.9 | 5.4 | 7.1 |
| 38 | 1.0 | 201 | 4.3 | 32.5 |
| 20 | 1.0 | 213 | 4.3 | 80 |
| 14.4 | 1.0 | 253 | 4.3 | 129 |
| 9.2 | 1.0 | 283 | 4.3 | 204 |
| 4.8 | 1.0 | 388 | 4.3 | 342 |
| 2.4 | 1.0 | 494 | 4.3 | 452 |
| 0 | 1.0 | 568 | 4.3 | 510 |

These experiments were carried out at room temperature. With exclusion of air no further drop in viscosity was noted even after three weeks. The rate of viscosity drop is also dependent upon the temperature as well as upon the concentration of oxidizing agent. In a series of experiments carried out at 50° C. the viscosity drop was similar to the series at room temperature, but the rate was very markedly accelerated.

By use of oxidizing agents acting on solid deacetylated chitin a product giving solutions of lowered viscosity my be produced. Thus in a series of experiments carried out at room temperature using five grams of deacetylated chitin and 200 c. c. of oxidizing solution, the following results were obtained.

Table V

| $H_2O_2$ | Viscosity of 5% solution (poises) |
|---|---|
| Parts per million | |
| 800 | 2.7 |
| 400 | 17.8 |
| 200 | 46 |
| 100 | 151 |
| 50 | 282 |
| 25 | 760 |
| 0 | 1970 |

In place of hydrogen peroxide other oxidizing agents such as sodium peroxide, barium peroxide, sodium perborates, sodium hypochlorite, calcium hypochlorite, potassium permanganate, sodium persulfate, etc. may be used. The oxidation may be carried out in alkaline or neutral solution with solid deacetylated chitin, although the oxidation is preferably conducted in alkaline medium because it is more rapid. Using the proportion of 800 p. p. m. oxidation equivalent in neutral solution the following results were obtained in reducing the viscosity of solid deacetylated chitin.

Table VI

| Oxidizing agent | Viscosity of 5% soln. (poises) |
|---|---|
| Sodium perborate | 1.22 |
| Sodium persulfate | 0.94 |
| Potassium permanganate | 0.75 |
| Hydrogen peroxide | 0.94 |
| Calcium hypochlorite | 8.85 |
| Sodium hypochlorite | 0.56 |
| Water | 1970 |

The viscosity of the deacetylated chitin may also be reduced in an easily controlled manner to obtain a product of improved solubility by treating the chitin before deacetylation with dilute hydrochloric acid (1.5%) at 65° C. for one hour or more. Variations in viscosity may be obtained by varying the concentration of acid, the temperature or the time.

The viscosity of the deacetylated chitin solutions may thus be decreased. It has also been observed that by suitable processes a solution of higher viscosity at the same concentration may be obtained. Thus a partially deacetylated chitin which, as the acetate in 5% aqueous solution, has a viscosity of 5 poises may, by heating the dry partially deacetylated chitin for 12 hours at 100° C. give a product which, in 5% aqueous solution, as the acetate, has a viscosity of 200–300 poises. The viscosity of this solution may be decreased as above and then again increased if so desired.

Since deacetylated chitin is essentially a highly polymeric free primary amine it forms salts with acids. Many of these salts are water soluble. Table VII lists some of the acids whose salts of deacetylated chitin have been prepared. These salts are prepared from substantially undegraded, partly deacetylated chitin containing about .8 free amino groups per chitosamine residue.

Table VII.—Salts of deacetylated chitin

| Acid | Solubility of salt in water | Viscosity of 5% solution in water (poises) |
|---|---|---|
| 1. Acetic | Easily soluble | 66 |
| 2. Glycollic | Easily soluble |  |
| 3. Maleic | Easily soluble | 83.6 |
| 4. Malonic | Easily soluble |  |
| 5. Succinic | Slowly soluble | 646 |
| 6. Oxalic | Difficultly soluble |  |
| 7. Phthalic | Slowly soluble |  |
| 8. Benzoic | Easily soluble |  |
| 9. Benzensulfonic | Easily soluble |  |
| 10. α-Bromo-n-butyric | Easily soluble |  |
| 11. α-Bromo-n-propionic | Easily soluble |  |
| 12. Phosphoric | Slightly soluble |  |
| 13. Phenyl glycine | Slightly soluble |  |
| 14. Iodoacetic | Easily soluble |  |
| 15. Sulfanilic | Easily soluble |  |
| 16. Formic | Easily soluble |  |
| 17. Dichloroacetic | Easily soluble |  |
| 18. Pyruvic | Easily soluble |  |
| 19. Lactic | Easily soluble |  |
| 20. Tartaric | Easily soluble | 29 |
| 21. Salicylic | Difficultly soluble |  |
| 22. Adipic | Easily soluble | 71 |

Table VII.—Salts of deacetylated chitin—Con.

| Acid | Solubility of salt in water | Viscosity of 5% solution in water (poises) |
|---|---|---|
| 23. Sebacic | Easily soluble |  |
| 24. Sulfonsalicylic | Easily soluble |  |
| 25. Citric | Easily soluble | 34 |
| 27. Malic | Easily soluble | 100 |
| 28. Lauric | Very slightly soluble |  |
| 29. Fumaric | Slowly soluble |  |
| 30. o-Benzoylbenzoic | Difficultly soluble |  |
| 31. Diphenic | Difficultly soluble |  |
| 32. Cinnamic | Difficultly soluble |  |
| 33. Mandelic | Easily soluble | 107 |
| 34. Glutamic | Easily soluble | 82.8 |
| 35. Hippuric | Easily soluble | 910 |
| 36. Furoic | Easily soluble | 75.2 |
| 37. Phenylacetic | Easily soluble |  |
| 38. Crotonic | Easily soluble |  |
| 39. Caproic | Easily soluble | 712 |
| 40. Propionic | Easily soluble | 260 |
| 41. Butyric | Easily soluble | 219 |
| 42. Diethylmalonic | Easily soluble |  |
| 43. Pelargonic | Difficultly soluble |  |
| 44. Isovaleric | Easily soluble | 275 |
| 45. Glycine | Difficultly soluble |  |
| 46. Palmitic | Very slightly soluble |  |
| 47. Terephthalic | Slightly soluble |  |
| 48. Chloroacetic | Easily soluble |  |
| 49. α-Chloropropionic | Easily soluble | 121 |
| 50. α-Chloroisobutyric | Easily soluble | 73.3 |
| 51. Cyanuric | Very slightly soluble |  |
| 52. Thioglycollic | Easily soluble |  |
| 53. 3-Nitrophthalic | Easily soluble | 48 |
| 54. α-Iodopropionic | Easily soluble | 139 |
| 55. Isobutyric | Easily soluble | 99 |
| 56. Naphthenic (Mol. Wt. 186) | Easily soluble |  |
| 57. Naphthenic (Mol. Wt. 450) | Easily soluble |  |
| 59. Linoleic | Difficultly soluble |  |
| 60. Anthranilic | Easily soluble | 21.1 |
| 61. Furacrylic | Easily soluble |  |
| 62. Hydroxyisobutyric | Easily soluble | 113 |
| 63. Sodium bisulfite | Difficultly soluble |  |
| 64. Boric | Slightly soluble |  |
| 65. Dithiocarbonic | Slowly soluble |  |
| 66. Sulfurous | Easily soluble |  |
| 67. Hydrochloric | Easily soluble |  |
| 68. Hydrobromic | Easily soluble |  |
| 69. Hydroiodic | Easily soluble |  |
| 70. Hypochlorous | Slowly soluble |  |

The deacetylated chitin used in Table VII in preparing these salts was all of the same batch, hence, the viscosities recorded are comparable.

The solution of salts of deacetylated chitin obtained according to this invention may be used in preparing formed articles such as films, filaments, caps and bands, and may be used as a sizing and coating material, as disclosed in copending applications Serial Numbers 731,601 and 731,602, filed June 21, 1934. Moreover, the solutions obtained according to this invention may be used as intermediates in preparing derivatives or in mixing with such other compositions such as plastic masses.

The deacetylated chitin obtained in the present invention is a substantially undegraded hexose amine polymer possessing properties highly advantageous and superior to those of the chitosan of the prior art. The alkaline treatment results in the removal of at least .2 but usually not quite all of the acetyl groups present without, however, removing any substantial proportion of the amino groups. Useful products contain, therefore, approximately from at least .2 up to about .9 free amino groups per chitosamine unit of the molecule. The product containing only about .2 free amino group per chitosamine residue is, if prepared from finely divided chitin, substantially completely swollen by dilute acetic acid but is only partially soluble therein. The new solutions obtained according to the present invention are capable of innumerable uses and show marked advantages over organic solvent soluble materials of the cellulose ester type. The process and products of the present invention are of peculiar advantage since the properties of the final product may be regulated by the conditions of purification and by the conditions under which deacetylation has been carried out.

The use of products which contain from .7 to .86 free amine groups per glucose amine residue is preferred. A product containing this quantity of free amine groups is desirable, first, because it retains good film-forming properties; second, the viscosity of these products is easy to control; third, the products are easily soluble in dilute acids, forming solutions free from gelatinous particles; fourth, the product within these limits is easily produced on a plant scale.

By the term "substantially undegraded" as used in this application, is meant substantially undegraded in the same sense as is used in cellulose chemistry. That is, by substantially undegraded is meant a product which retains the properties of forming coherent films, of giving viscous solutions, and of being insoluble in water without the addition of acids. On theoretical grounds, this probably means that if one considers deacetylated chitin as a long chain polymerized glucose amine derivative, the chain lengths are presumably from about 100 to 1,000 or more glucose amine units in length. However, it is impossible at the present state of our knowledge to fix definite lengths for these chains any more than it is possible to fix definite chain lengths for derivatives known as substantially undegraded cellulose.

As many apparently widely different embodiments of this invention may be made without departing from the spirit and scope thereof, it is to be understood that I do not limit myself to the specific embodiments thereof except as defined in the appended claims.

I claim:

1. Process of preparing substantially undegraded at least partially deacetylated chitin which comprises heating purified chitin with a caustic alkali solution and continuing said treatment until the product is capable of being at least swollen in 5% acetic acid and discontinuing said treatment before the product becomes substantially degraded.

2. Process of preparing substantially undegraded at least partially deacetylated chitin which comprises heating purified chitin with a caustic alkali solution above a temperature of about 80° C. but below the temperature at which ammonia is evolved in substantial amounts in the presence of a caustic alkali solution of the concentration used and continuing said treatment until the product is capable of being at least swollen in 5% acetic acid and discontinuing said treatment before the product becomes substantially degraded.

3. Process of preparing substantially undegraded at least partially deacetylated chitin which comprises heating purified chitin with a caustic alkali solution under limited access of air and continuing said treatment until the product is capable of being at least swollen in 5% acetic acid and discontinuing said treatment before the product becomes substantially degraded.

4. Process of preparing substantially undegraded at least partially deacetylated chitin which comprises heating purified chitin with a caustic alkali solution under limited access of air above a temperature of about 80° C. but below the temperature at which ammonia is evolved in substantial amounts in the presence of caustic alkali of the concentration used and continuing said treatment until the product is capable of being at least swollen in 5% acetic acid and discontinuing said treatment before the product becomes substantially degraded.

5. Process for preparing substantially undegraded at least partially deacetylated chitin, which comprises treating chitin at elevater temperatures with solutions of metal hydroxide bases until from .2 to .9 of the acetyl groups have been removed and .2 to .9 free amino groups per $C_6$ unit have been formed.

6. Process for preparing substantially undegraded at least partially deacetylated chitin, which comprises treating chitin at elevated temperatures with solutions of metal hydroxide bases under limited access of air until from .2 to .9 of the acetyl groups have been removed and .2 to .9 free amino groups per $C_6$ unit have been formed.

7. Process of preparing substantially undegraded at least partially deacetylated chitin, which comprises treating chitin with 5 to 60% caustic soda at temperatures up to 150° C., until a product soluble in dilute acetic acid is obtained, the lower temperature ranges being used with the higher caustic soda concentrations.

8. Process of preparing substantially undegraded at least partially deacetylated chitin under limited access of air, which comprises treating chitin with 5 to 60% caustic soda at temperatures up to 150° C., until a product soluble in dilute acetic acid is obtained, the lower temperature ranges being used with the higher caustic soda concentrations.

9. Process of preparing substantially undegraded at least partially deacetylated chitin, which comprises purifying chitin-containing raw materials by treatments with dilute acid and dilute alkali, treating the purified chitin thus obtained with solutions of metal hydroxide bases at elevated temperatures, the more concentrated solutions of metal hydroxide bases being used at relatively low temperatures.

10. Process of preparing substantially undegraded at least partially deacetylated chitin, which comprises treating chitin-containing material with successive alkaline and acid washes to remove protein and lime, and then heating with an excess of 40 to 50% sodium hydroxide solution for 1 to 6 hours at 110 to 115° C., a shorter time and a lower temperature being employed with the higher concentration of sodium hydroxide.

11. Process of preparing substantially undegraded at least partially deacetylated chitin, which comprises treating chitin-containing material with successive alkaline and acid washes to remove protein and lime, and then under limited access of air heating with an excess of 40 to 50% sodium hydroxide solution for 1 to 6 hours at 110 to 115° C., a shorter time and a lower temperature being employed with the higher concentration of sodium hydroxide.

12. Process of preparing useful solutions of deacetylated chitin, comprising reacting substantially undegraded at least partially deacetylated chitin with an acid to form an addition salt thereof and forming an aqueous solution of said salt.

13. Process of preparing useful solutions of deacetylated chitin which includes the step of lowering the solution viscosity of the deacetylated chitin by treatment with an oxidizing agent.

14. Substantially undegraded at least partially deacetylated chitin.

15. An addition salt of a substantially undegraded at least partially deacetylated chitin with an acid.

16. An (addition) acetate of substantially undegraded at least partially deacetylated chitin.

17. Aqueous solutions of addition salts of substantially undegraded deacetylated chitin.

18. Process of increasing the solution viscosity of partially deacetylated chitin comprising heating dry partially deacetylated chitin at an elevated temperature for a substantial time.

19. In the process of preparing substantially undegraded deacetylated chitin, the step which comprises heating chitin containing material with mineral acid.

20. In the process of preparing substantially undegraded deacetylated chitin, the step which comprises heating chitin containing material with from 1% to 5% hydrochloric acid at 0° to 100° C.

GEORGE W. RIGBY.

CERTIFICATE OF CORRECTION.

Patent No. 2,040,879.  May 19, 1936.

GEORGE W. RIGBY.

It is hereby certified that error appears in the printed specification of the above numbered patent requiring correction as follows: Page 2, second column, line 56, for the word "is" first occurrence, read it; page 4, second column, line 48-49, for "concentratoin" read concentration; page 6, first column, line 74, claim 4, for "cintinuing" read continuing; and second column, line 6, claim 5, for "elevater" read elevated; and that the said Letters Patent should be read with these corrections therein that the same may conform to the record of the case in the Patent Office.

Signed and sealed this 1st day of September, A. D. 1936.

(Seal)

Leslie Frazer
Acting Commissioner of Patents.